(12) United States Patent  
Kovacs et al.

(10) Patent No.: US 7,069,528 B2
(45) Date of Patent: Jun. 27, 2006

(54) SYSTEM AND METHOD FOR REDUCING TIMING VIOLATIONS DUE TO CROSSTALK IN AN INTEGRATED CIRCUIT DESIGN

(75) Inventors: Attila Kovacs, Santa Clara, CA (US); Jeffrey A. Buckles, Aloha, OR (US)

(73) Assignee: NEC Electronics America, Inc., Santa Clara, CA (US)

( * ) Notice: Subject to any disclaimer, the term of this patent is extended or adjusted under 35 U.S.C. 154(b) by 267 days.

(21) Appl. No.: 10/650,010

(22) Filed: Aug. 27, 2003

(65) Prior Publication Data

US 2005/0050496 A1 Mar. 3, 2005

(51) Int. Cl.
*G06F 17/50* (2006.01)

(52) U.S. Cl. ............................ 716/6; 716/10; 716/12

(58) Field of Classification Search ............... 716/6–14
See application file for complete search history.

(56) References Cited

U.S. PATENT DOCUMENTS

| | | | | |
|---|---|---|---|---|
| 5,784,600 | A | * | 7/1998 | Doreswamy et al. ........... 716/6 |
| 5,883,812 | A | * | 3/1999 | Fujii ............................. 716/10 |
| 6,058,256 | A | * | 5/2000 | Mellen et al. ................ 716/12 |
| 6,256,769 | B1 | * | 7/2001 | Tamarkin et al. ............. 716/12 |
| 6,353,917 | B1 | * | 3/2002 | Muddu et al. .................. 716/6 |
| 2002/0104064 | A1 | | 8/2002 | Sasaki |
| 2002/0166101 | A1 | | 11/2002 | Casavant |
| 2003/0060034 | A1 | * | 3/2003 | Beyne et al. .................. 716/14 |

OTHER PUBLICATIONS

*Magma Design Automation, Inc.*, "Blast Noise," http://www.magma-da.com/c/@5W5T6bRF5RBy./Pages/blastnoise.html, 2002, pp. 1-2.
Murat Becer, et al., *Motorola, Inc.*, "Signal Integrity Management in an SoC Physical Design Flow," ISPD'03, Apr. 6-9, 2003, pp. 39-46.

Richard Goering, *Planet Analog*, "Motorola Designers Offer Ways to Check IC Noise," http://www.planetanalog.com/showArticle?articleID=12803998, Apr. 11, 2003, pp. 1-2.
*EE Times*, "How Crosstalk Causes Problems," http://www.eedesign.com/story/OEG20020604S0046, Jun. 5, 2002, pp. 1-2 (printed Aug. 26, 2003).
Tak Young, *Monterey Design Systems, Inc. and EE Times*, "IC layout Must Avoid Crosstalk Problems," http://www.eedesign.com/story/OEG20020604S0045, Jun. 5, 2002, pp. 1-4 (printed Aug. 26, 2003).
Bijan Kiani and Anthony Hill, *EE Times, Synopsys, Inc and, Texas Instruments, Inc.*, "Static Crosswalk Analysis Assures Silicon Success," http://www.eedesign.com/story/OEG20020604S0047, Jun. 5, 2002, pp. 1-4 (printed Aug. 26, 2003).
*ASIC News*, "Cadence Introduces CeltIC 4.0," http://www.chipcenter.com/asic/products_300-399/prod300.html, pp. 1-4 (printed Aug. 26, 2003).

* cited by examiner

*Primary Examiner*—Paul Dinh
(74) *Attorney, Agent, or Firm*—Campbell Stephenson Ascolese LLP

(57) ABSTRACT

A method involves: detecting a timing violation in a timing path included in an integrated circuit design; removing a wire, which couples two nodes in the integrated circuit design and is included in the timing path; and routing a new wire between the two nodes. The new wire is longer than the removed wire. The method can also involve: calculating timing information (e.g., delay and/or slew information) for the wires included in the timing path and selecting the wire for removal dependent on the timing information. In some embodiments, such a method eliminates timing violations that arise due to crosstalk in a single post-timing-analysis routing pass.

50 Claims, 3 Drawing Sheets

FIG. 2

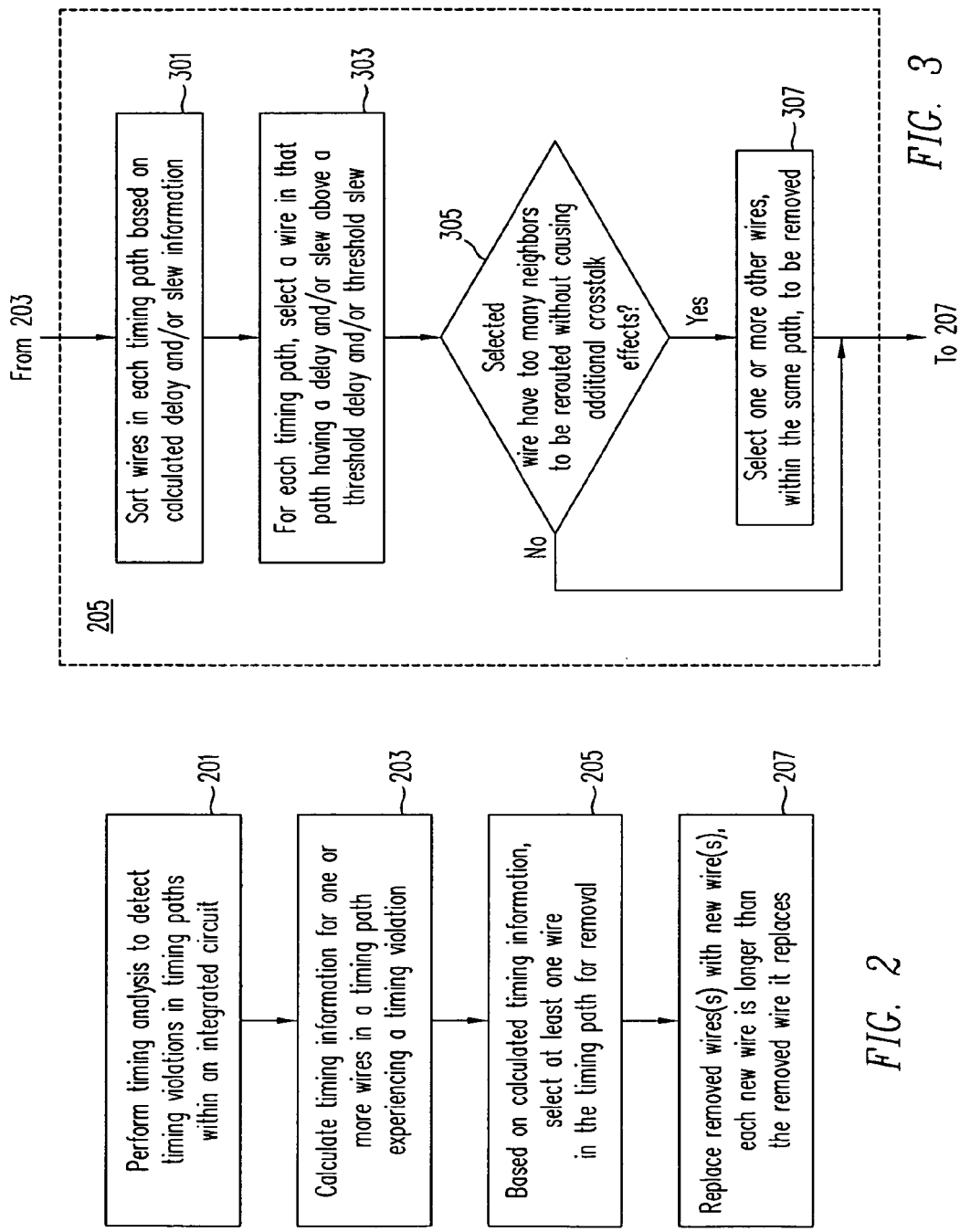

SYSTEM AND METHOD FOR REDUCING TIMING VIOLATIONS DUE TO CROSSTALK IN AN INTEGRATED CIRCUIT DESIGN

FIELD OF THE INVENTION

This invention relates to ICs (Integrated Circuits) and, more particularly, to IC design techniques for reducing timing violations that arise due to crosstalk between wires in an IC.

BACKGROUND

As IC (Integrated Circuit) geometries have become smaller, crosstalk has increasingly caused problems in IC design. Crosstalk occurs when two signals become partially superimposed on each other due to electromagnetic (inductive) or electrostatic (capacitive) coupling between the conductors carrying those signals. Crosstalk may arise, for example, if a magnetic field caused by changing current flow in one wire induces a current in another, parallel wire. Crosstalk typically involves an aggressor wire inducing timing changes and/or noise on a victim wire. Crosstalk often increases or decreases the delays within a circuit, and these varied delays can in turn lead to timing violations.

The timing analysis that identifies timing violations due to crosstalk is often performed by a sign-off EDA (Electronic Design Automation) tool. Typically, the sign-off tool is used to perform the final verification of an IC design (e.g., based on the design's performance, as determined by the sign-off tool, the design is "signed-off" for implementation in silicon). Since this timing analysis is performed as one of the final design stages, timing violations due to crosstalk are often not detected until relatively late in the design process.

Once timing violations due to crosstalk are detected, conventional processes for eliminating these timing violations may take several design iterations to implement. For example, one technique commonly used to reduce crosstalk effects between a pair of wires involves increasing the driver strength of the driver on the victim wire. However, this may in turn cause the wire that was previously a crosstalk victim to become a crosstalk aggressor with respect to another of its neighboring wires. As a result, another round of adjustments will be needed to deal with the new crosstalk effects, and adjustments made during that round are likely to cause additional crosstalk problems. Multiple design passes can be required to eliminate all of the timing violations.

As the above example shows, dealing with crosstalk effects can significantly complicate the final stages of the IC design process by adding several additional design iterations. These additional design iterations are undesirably expensive in terms of both time and resources needed to obtain an IC design that will pass sign-off timing analysis.

SUMMARY

Various methods and systems for reducing timing violations that arise due to crosstalk are disclosed. These methods and systems may, in at least some embodiments, allow timing violations in an IC design to be eliminated in a single post-timing-analysis routing pass.

A method involves: detecting a timing violation in a timing path included in an integrated circuit design; removing a wire, which couples two nodes in the integrated circuit design and is included in the timing path; and routing a new wire between the two nodes. The new wire is longer than the removed wire. The new wire can be routed through a higher routing layer than the removed wire.

In some embodiments, the method also involves: calculating timing information (e.g., delay and/or slew information) for the wires included in the timing path; and selecting the wire for removal dependent on the timing information. The wire can be selected for removal if, for example, delay information indicates that the wire has a greater delay than other wires included in the timing path. Alternatively, the wire can be selected for removal in response to delay information indicating that the delay of the wire exceeds a threshold delay.

Program instructions executable to implement such a method can be stored on a computer readable medium. A computer system that includes a memory and a processor can store such program instructions in the memory for execution by the processor.

An integrated circuit can be designed using the above process. In some embodiments, an integrated circuit designed by such a process includes an empty space through which a shorter wire coupling the two nodes could have been placed during fabrication of the integrated circuit.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

FIG. 2 is a flowchart of one embodiment of a method of eliminating timing violations from an integrated circuit design.

FIG. 3 illustrates how a wire within a timing path for which a timing violation has been detected can be selected for removal, according to one embodiment.

Figure 1A:
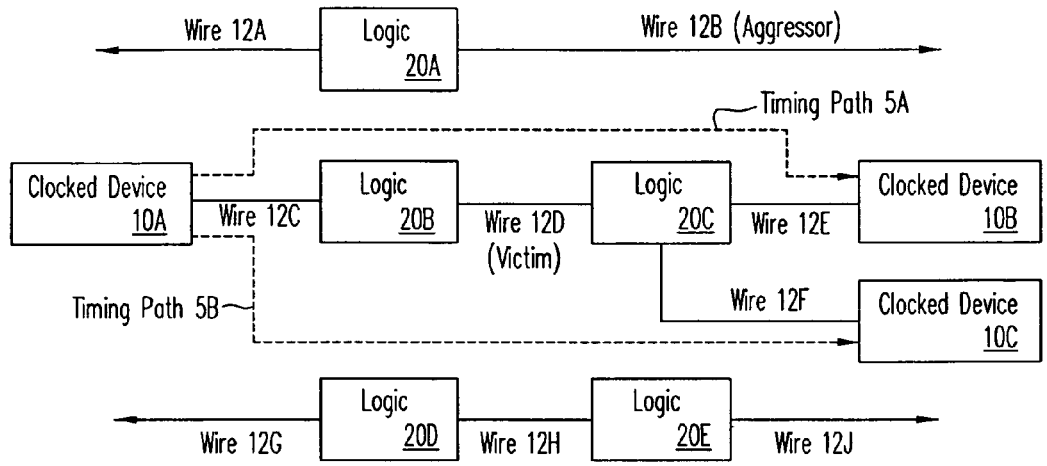
FIGS. 1A–1C illustrate how a wire in a timing path may be removed and replaced with a longer wire in response to detection of a timing violation in the timing path, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 1B:
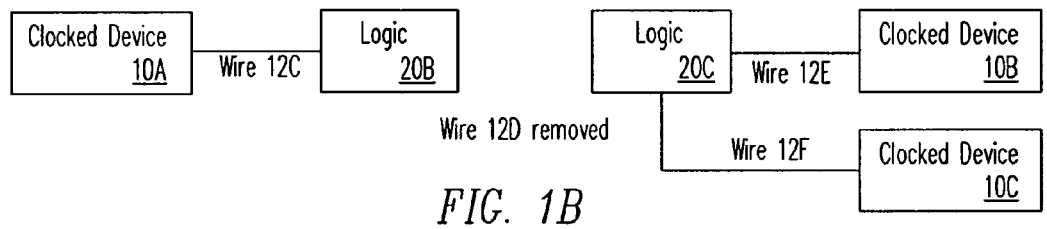
Figure 1C:
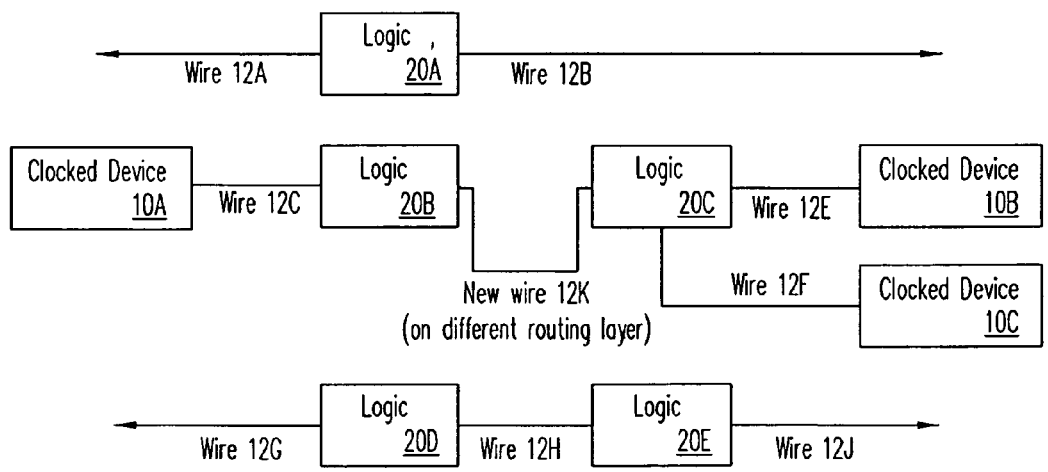

FIGS. 1A–1C illustrate how a wire in a timing path may be removed and replaced with a longer wire in response to detection of a timing violation in the timing path, according to one embodiment. Various techniques for selecting which wire to remove from the timing path are discussed below with respect to FIG. 2 and FIG. 3. It is noted that FIGS. 1A–1C show an example IC (Integrated Circuit) design, and that similar techniques for removing and replacing a wire in a path for which a timing violation is detected may be employed in many other IC designs. Such other IC designs may include a much greater number of wires, logic devices, and clocked devices in significantly different arrangements than that shown in FIGS. 1A–1C.

FIG. 1A shows a block diagram of an arrangement of components in an IC design. At the top of FIG. 1A, a wire 12A is coupled to logic 20A, which in turn is coupled to wire 12B. The other ends of wires 12A and 12B are not shown. FIG. 1A also shows a clocked device 10A coupled to logic 20B by wire 12C. Logic 20B is in turn coupled to logic 20C by wire 12D. Logic 20C is coupled to clocked device 10B by wire 12E and to clocked device 10C by wire 12F. Also in FIG. 1A is a wire 12G coupled to logic 20D. The other end of wire 12G is not shown. Logic 20D is coupled to logic 20E by wire 12H. Another wire 12J is coupled to logic 20E. The other end of wire 12J is not shown. Wires 12C, 12D, and 12E are included in timing path 5A, and wires 12C, 12D, and 12F are included in timing path 5B. Timing paths 5A and 5B are collectively referred to as timing paths 5.

As used herein, a "timing path" is a path through an IC design that begins at a starting point (e.g., where a clock is launched or where data is launched in response to a clock edge), passes through various logic devices (e.g., combinatorial logic, buffers, and the like), and ends at an ending point (e.g., where a clock is received or where data is captured according to a clock edge). A starting point can include a data or clock pin of a sequential element within the IC or a data or clock input port of the IC itself. Likewise, an ending point can include a data or clock pin of a sequential element within the IC or an output port of the IC itself. For purposes of this disclosure, "wires" within a timing path include wires used to couple cells or other representations of components (such cells and other representations of components are referred to herein as nodes) in the IC design and do not include interconnections within an IC cell or other component.

In the example of FIG. 1A, wire 12B is a crosstalk aggressor with respect to wire 12D, which is a crosstalk victim. As a crosstalk aggressor, wire 12B may cause changes in the delay that would otherwise (if no crosstalk aggressor were present) be calculated for wire 12D. This crosstalk effect may either increase or decrease the delay of wire 12D. Additionally, the crosstalk between aggressor wire 12B and victim wire 12D may change the slew that would otherwise be calculated for wire 12D. No other wires (collectively, wires 12) are currently experiencing crosstalk effects in the illustrated example.

Because of wire 12D's status as a crosstalk victim, a timing violation (e.g., a setup or hold violation) is detected in both timing path 5A and timing path 5B during timing analysis of the IC design. A timing violation occurs whenever a timing requirement, such as a setup or hold requirement at a particular input, is not met. For example, a timing violation can include a setup violation at an input to clocked device 10B and/or clocked device 10C if, for example, crosstalk between wires 12B and 12D causes a decrease in the delay of wire 12D. If instead crosstalk between wires 12B and 12D causes an increase in the delay of wire 12D, a hold violation may be detected at an input of clocked device 10B and/or clocked device 10C.

FIG. 1B illustrates how, in response to the detection of timing violations in timing paths 5A and 5B, one or more wires in each timing path are selected for removal and replacement with longer wires. Wire 12D (the crosstalk victim) is the wire that is selected for replacement in the example of FIGS. 1A–1C. This wire may be removed by effectively deleting information (e.g., a network signal, or "net") representing the wire from the data (e.g., a netlist) representing the IC design. As shown in this example, the same wire 12D can be selected for multiple timing paths.

FIG. 1C illustrates how the removed wire 12D is replaced with a new, longer wire 12K that couples logic 20B and logic 20C. In this example, wire 12K is longer than wire 12D by virtue of being routed through a higher routing layer than wire 12D. Typically, there are several (e.g., six or eight) routing layers available for routing wires between cells in an IC design. Higher routing layers (relative to the layers on which logic devices are fabricated) typically provide for wider wires and more spacing between wires than lower routing layers (which are closer to the layers on which logic devices are fabricated). A wire that passes through different routing layers includes vias that connect the portions of the wire that are on different routing layers.

By replacing wire 12D with a longer wire 12K, the timing violation in timing paths 5A and 5B can be eliminated without causing additional timing violations due to crosstalk in other timing paths. In this example, by routing the replacement wire 12K through a higher routing layer, the replacement wire 12K is much less likely to be a crosstalk victim or aggressor with respect to any neighboring wires due to the increased spacing and/or increased wire width of the upper routing layer relative to the lower layer on which wire 12D was routed. Additionally, in situations in which the timing violation arose due to increased delay on wire 12D, the delay of wire 12K may be significantly less than the actual delay of wire 12D even though wire 12K may have a longer delay than wire 12D would have had if wire 12D had not been a crosstalk victim. In many situations, due to wire 12K not experiencing any crosstalk, the delay and/or slew calculated of wire 12K will be less than the delay and/or slew of wire 12D, despite the longer length of wire 12K.

It is noted that replacing a wire with a longer wire in response to detection of a timing violation goes against the conventional teachings of IC design, which focus on minimizing wire lengths in order to minimize delay. In typical solutions, drivers and buffers are modified to correct a timing violation and wire length is left unchanged. However, as noted before, these types of modifications can cause additional timing violations to arise within the IC design. By modifying the wire length, the modification can be isolated and thus additional crosstalk effects may not be propagated to other parts of the IC design. This in turn can reduce the number of iterations of timing analysis and design modification needed to achieve a timing-violation-free design.

FIG. 2 is a flowchart of one embodiment of a method of eliminating timing violations from an integrated circuit design. At 201, timing analysis is performed to detect timing violations in timing paths within an integrated circuit design. This can involve performing static timing analysis on data (such as a netlist) representing the integrated circuit design to generate a timing report. The timing report indicates the timing paths, if any, in which timing violations were detected in the integrated circuit design. In some embodiments, each timing path is identified by its starting and ending point. This timing analysis can be performed by an EDA sign-off tool that is used to determine whether a post-layout IC design is operating properly (e.g., by checking the IC design's functional behavior and compliance with timing requirements).

At 203, timing information is calculated for wires in a timing path in which a timing violation was detected. This timing information can include, for example, delay and/or slew information. Delay information for a wire indicates the amount of delay from the output of a device (e.g., as represented by a cell instance) coupled to one end of the wire to the input of the next device, which is coupled to the other end of the wire. This delay information can also be referred to as net delay. Slew information indicates how long it takes for a signal being conveyed on a wire to transition from high-to-low or from low-to-high.

In some embodiments, the same EDA tool can perform functions 201 and 203. These functions may also be performed at substantially the same time. For example, an EDA tool may generate a timing report that identifies each timing path in which a timing violation is detected and also includes timing information for at least some of the wires within those timing paths. In other embodiments, one EDA tool can be used to detect the timing violations while another EDA tool is used to generate the timing information.

Based on the timing information calculated at 203, one or more of the wires in the timing path are selected for removal, as indicated at 205 (additional details regarding how this selection can be performed are discussed below in reference to FIG. 3). Each removed wire is then replaced with a longer wire, as indicated at 207. The new wire is longer by virtue of being routed in such a way that the new wire does not have any neighboring wires with which it is likely to experience crosstalk. To isolate the new wire from such crosstalk, the new wire can be routed through an empty track on the same layer and/or on a different routing layer than the removed wire. The new wire can be placed such that a certain amount of space, the size of which is selected to reduce crosstalk effects with other wires, exists between the new wire and any other wire in the IC design.

In at least some embodiments, when the removed wires are each replaced with new wires at 207, each of the drivers, previously used to drive signals on the removed wires, are not adjusted. Accordingly, the driver for driving signals on a new wire can be substantially the same size as a driver used to drive signals on a removed wire. Similarly, no new buffers are inserted into the IC design along the path of the new wire. By not adding additional components, not adjusting the characteristics of the existing components, and spacing the new wire away from existing wires, the likelihood of the replacement wire introducing new crosstalk effects into the IC design is reduced. Thus, existing timing violations can be corrected without introducing new timing violations into the IC design. This can in turn reduce the number of routing passes needed to produce a final design that passes the sign-off timing analysis. In some embodiments, the method of FIG. 2 can be performed using a single routing pass (e.g., function 207 is performed a single time to replace all of the removed wires and produces a final design that passes sign-off timing analysis).

It is noted that the detection of timing violations is based on a model of the IC design instead of being based on actual performance of an IC itself, and that the modeling process may introduce variations into the behavior of the IC design relative to the actual behavior of a physical IC. Thus, detection of timing violations in the IC design at 201 may identify a different set of timing paths as having violations than would be identified if similar analysis were performed on an IC produced from the IC design.

FIG. 3 illustrates how a wire within a timing path for which a timing violation has been detected can be selected for removal based on timing information associated with one or more wires within that timing path, according to one embodiment. Other embodiments can use similar techniques to select a wire for removal based on timing information but may vary the specific functions performed during the selection process and/or use different types of timing information to make their selection.

In this example, the timing information used to select a wire for removal includes delay and/or slew information. At 301, one or more wires included in each timing path are sorted based on delay and/or slew information. For example, the wires may be sorted in descending order based on delay information for each wire. Slew information, if available, for each wire may be used as a secondary criteria when sorting the wires. For example, if two wires have similar delays but one wire has significantly larger slew than the other, the wire with the larger slew can be ordered ahead of the wire with the wire with the smaller slew. It is noted that this technique is merely an example and that other sorting techniques (e.g., with slew as a primary criteria and delay as a secondary criteria) can be used in other embodiments. In some embodiments, wires can be sorted independently for each timing path (e.g., a sorted list may be generated for each timing path), while in other embodiments, wires in a group of timing paths can be collectively sorted. In one such embodiment, if the same wire is included in multiple timing paths within the group, that wire is only included a single time in the sorted list.

Sorting the wires allows the identification of wires having delay and/or slew information that exceeds a threshold delay and/or a threshold slew. For example, if the wires are sorted based on delay, the sorted list of wires can be searched, beginning with the wire having the most delay, to find the first wire with a delay less than the threshold delay. All of the wires listed between the wire with the greatest delay and that first wire have delays exceeding the threshold delay.

For each timing path, a wire whose delay and/or slew exceeds the threshold delay and/or slew is selected, as indicated at 303. If no wires in a given timing path for which a timing violation was detected include wires whose delay and/or slew exceed the threshold delay and/or slew, wire selection in that timing path can be prioritized based on the magnitude of delay and/or slew for each wire. For example, one or more wires with the largest delay can be selected if there is no wire within the timing path with a delay exceeding the threshold delay.

In some embodiments, multiple wires within a single timing path are selected for removal. For example, if two wires in a timing path have a delay that exceeds the threshold delay, both wires can be selected for removal. Alternatively, if no wires in a timing path have a delay that exceeds the threshold delay, multiple wires in that timing path can be selected based on the magnitude of each wire's delay (e.g., wires with the highest delays of wires in that timing path can be selected). Whether more than one wire is selected for a given timing path depends on the magnitude of the delays and/or slews of the wires in that timing path. For example, if no wire in a timing path has a delay exceeding the threshold delay but one wire has a significantly higher delay than any other wire in that timing path, the single wire with the highest delay can be selected. If instead several wires have relatively small delays of similar magnitude, one or more of those wires can be selected.

The threshold delay and the threshold slew may be established based on the timing constraints of the IC design. For example, for a given set of timing constraints (such as setup and hold times), a set of delay and slew values can be identified that, if exceeded, guarantee that a timing path will not meet the timing constraints, and these values can be used to select the threshold delay and slew. Another set of delay and slew values can be selected based on the expected performance of typical wires in the IC design, absent any crosstalk effects. For example, the worst case delay expected for a wire of a given length and width, absent crosstalk, can be taken into account when selecting the threshold delay. In one embodiment, the threshold delay can be selected to be higher than the expected worse case delay, absent crosstalk, and lower than the delay value that would guarantee a timing violation. It is noted that the above threshold delay and slew calculation techniques are provided as an example; in other embodiments, different criteria can be used to establish threshold delay and threshold slew.

The proximity of the wire (or wires) selected at 303 to other wires can be taken into account when selecting wires for removal. For example, if the selected wire has too many neighboring wires to be rerouted without the rerouted wire causing or suffering from additional crosstalk effects, as determined at 305, a different wire (or multiple other wires) in that timing path is selected for removal, as indicated at 307. A wire has too many neighboring wires to be rerouted if, for example, most or all of the tracks surrounding that wire, both on the same routing layer and on higher and lower routing layers, are already populated with other wires. If a wire is disqualified due to having too many neighbors to be successfully rerouted, one or more other wires within the same timing path can be selected for removal based on, for example, their relative delays and/or slews, their proximity to other wires, and/or their inclusion in more than one timing paths for which timing violations were detected.

Some embodiments may perform other functions in addition to and/or instead of some of the functions of FIG. 3. For example, in one embodiment, if there are a significant number of paths in which timing violations are detected that are located relatively close together in the IC design, wire selection can be prioritized based on whether a wire has a delay that exceeds a threshold delay and whether that wire is included in more than one of the timing paths that have timing violations. For example, if wires are relatively crowded (e.g., there are few empty tracks adjacent to each wire) within an area of the IC design through which several timing paths having timing violations pass, it may be more effective to remove and replace wires that are each included in several different timing paths and that do not have the largest delays in their respective timing paths than to simply remove and replace wires having the absolute largest delays in each timing path.

In some embodiments, some of the functions performed in the example of FIG. 3 are eliminated. For example, wires having delays and/or slew that exceed a threshold delay and/or threshold slew can be identified by simply comparing each wire's delay and/or slew to the threshold delay and/or slew without first sorting the wires. Thus, in one embodiment, the sorting function, shown at 301, may be eliminated.

Figure 4:
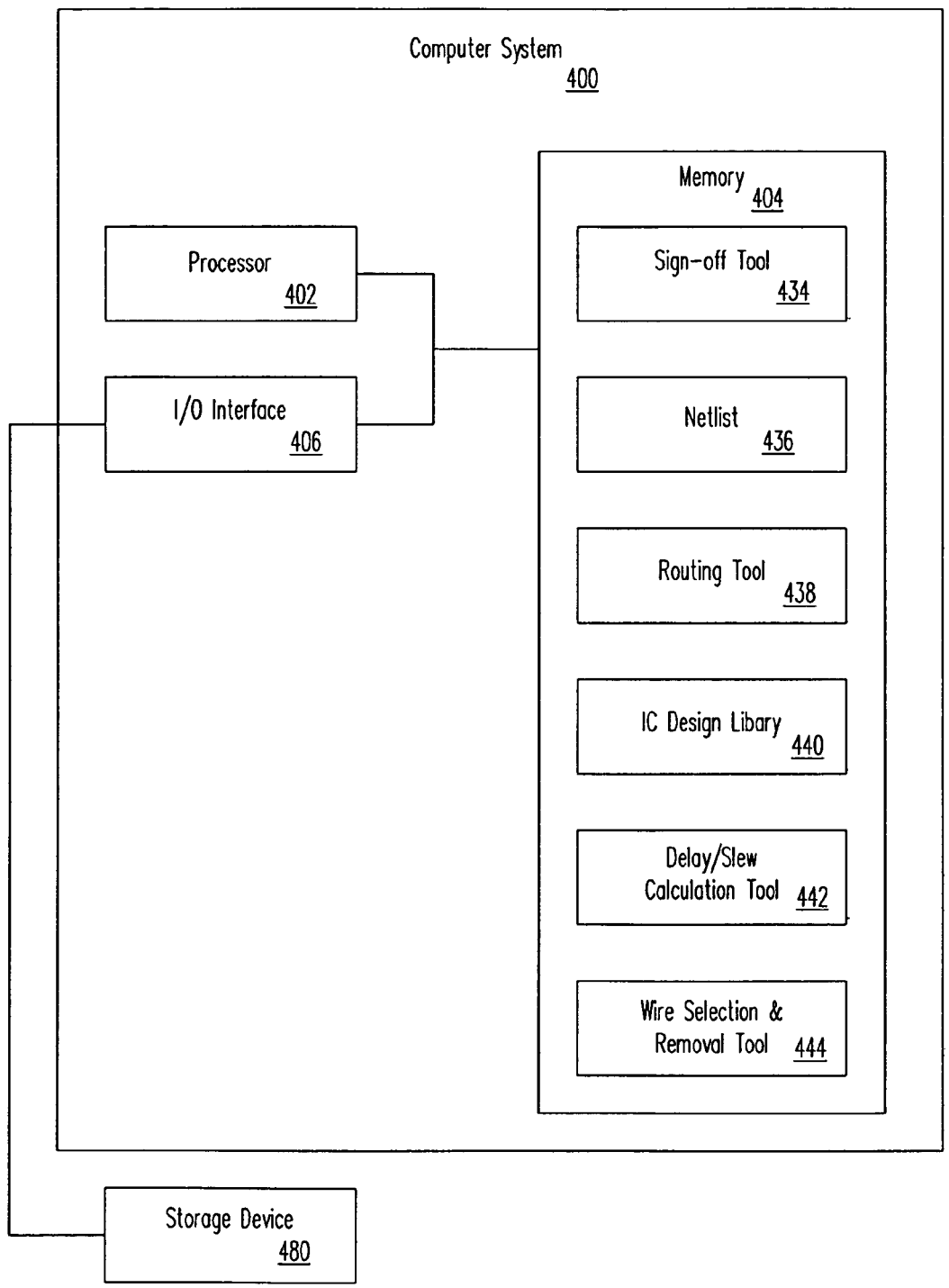
FIG. 4 shows a block diagram of a computer system that includes software configured to remove a wire from a timing path and to replace that wire with a longer wire in order to correct a timing violation in the timing path, according to one embodiment.

FIG. 4 shows a block diagram of a computer system that includes software configured to remove a wire from a timing path and to replace that wire with a longer wire in order to correct a timing violation in the timing path, according to one embodiment. As illustrated, computer system 400 includes one or more processors 402, I/O interface 406 (e.g., a bus bridge, network interface card, or other device for interfacing to other computers or to peripheral devices), and memory 404. Memory 404 stores data and instructions executable by processor 402 to implement sign-off tool 434, netlist 436, routing application 438, IC design library 440, and delay/slew calculation tool 442. The instructions and data stored in memory 404 can be organized into one or more data and/or program files.

I/O interface 406 is coupled to a storage device 480. Storage device 480 can be coupled to computer system 400 by a bus, network (e.g., the Internet), or other interconnect. Storage device 480 provides a persistent store for information accessed by computer system 400 and can be implemented using magnetic, optical and/or mechanical (e.g., MEMS (Micro Electro-Mechanical Systems) memory. Storage device 480 can include a single storage device or an array of storage devices.

Sign-off tool 434 is configured to perform timing analysis of a substantially complete IC design. The timing analysis performed by sign-off tool 434 can detect timing violations in timing paths within the IC design and generate a timing report that identifies each timing path for which a timing violation is detected.

Netlist 436 includes data representing the IC design. Netlist 436 can include various cell instances and/or other information representing different logical components of the IC design. Netlist 436 also includes information describing the wires that provide signals from one component to another component.

Routing tool 438 is configured to route wires between cell instances or other components in IC design. Routing tool 438 receives inputs identifying components between which a wire is to be routed and any constraints on how the wire can be routed between those components. For example, wire selection and removal tool 444 can provide information identifying which wires to replace and routing constraints on those wires (e.g., such routing constraints may indicate that the new wire should be longer that the removed wire and/or that the new wire should be spaced far enough away from existing wires so as to be unlikely to cause any crosstalk effects). In response to these inputs, routing tool 438 routes a wire between the identified components according to the routing constraints and updates netlist 436 to reflect the new wire.

IC design library 440 includes various standard components and precalculated information useable to model the performance and functionality of those components. Tools such as sign-off tool 434, routing tool 438, and/or delay/slew calculation tool 442 can access information included in IC design library 440 to obtain more information regarding a particular component included or considered for inclusion in netlist 436. For example, when performing timing analysis, sign-off tool 434 accesses IC design library 440 to obtain information about the timing performance of a component represented by a standard cell in netlist 436.

Delay/slew calculation tool 442 is configured to calculate timing information such as delay and/or slew information for wires included in a particular timing path. Delay/slew calculation tool 442 can receive a list of timing paths in which timing violations were detected and responsively access netlist 436 and/or IC design library 440 to calculate delay and/or slew for one or more wires in each of the timing paths. Delay/slew calculation tool 442 can store (e.g., in memory 404 and/or storage device 480) the calculated delay and/or slew values (or the values of any other calculated timing information) for use by wire selection and removal tool 444. In some embodiments, the functionality of delay/slew calculation tool 442 is integrated with that of sign-off tool 434.

It is noted that, in at least some embodiments, the tools and data illustrated as being stored in memory 404 in FIG. 4 can be distributed across computer systems and storage devices linked by one or more networks. For example, netlist 436 may be stored in a storage device coupled to computer system 400 by a LAN (Local Area Network) or SAN (Storage Area Network). Portions of netlist 436 can be loaded into memory 404 of a particular computer system as different parts of the IC design are analyzed by applications such as sign-off tool 434 executing on that computer system.

Different applications can execute on different computer systems and exchange results via a network. For example, wire selection and removal tool 444 can be configured to select wires for removal, to remove the selected wires, and then to store information identifying the removed wires and routing parameters for the replacement wires to a network storage device. This stored information can then be accessed by routing tool 438, which is executing on a different computer system than wire selection and removal tool 444.

The tools illustrated as being separate applications in FIG. 4 can also be implemented as a single application in some embodiments. For example, functionality implemented by sign-off tool 434, delay/slew calculation tool 442, routing tool 438, and wire selection and removal tool 444 can be integrated into a single application that detects timing violations in timing paths, calculates timing information for wires in timing paths in which a timing violation is detected, selects at least one wire from each timing path for removal, and routes a new wire for each removed wire.

The program instructions and data implementing sign-off tool 434, netlist 436, routing tool 438, IC design library 440, delay/slew calculation tool, and/or wire selection and removal tool can be stored upon various computer readable media such as memory 404. In some embodiments, software implementing at least some of these tools is stored on a computer readable medium such as a CD (Compact Disc), DVD (Digital Versatile Disc), hard disk, optical disk, tape device, floppy disk, and the like). In order be executed by processor 402, the instructions and data implementing the tools are loaded into memory 404 from the other computer readable medium. In some embodiments, a computer readable medium is a carrier medium such as a network and/or a wireless link upon which signals such as electrical, electromagnetic, or digital signals, on which the data and instructions implementing the tools are encoded, are conveyed.

Although the present invention has been described with respect to a specific embodiment thereof, various changes and modifications may be suggested to one skilled in the art. It is intended that such changes and modifications fall within the scope of the appended claims.

What is claimed is:

1. A method, comprising:
   detecting a timing violation, caused by crosstalk, in a timing path included in an integrated circuit design;
   removing one of one or more wires included in the timing path, wherein the one of the one or more wires couples two nodes included in the integrated circuit design; and
   routing a new wire between the two nodes, wherein the new wire is longer than the removed one of the one or more wires, and wherein the new wire experiences fewer crosstalk effects than the removed one of the one or more wires, wherein
   a driver for driving signals on the new wire has substantially a same size as a driver for driving signals on the one of the one or more wires removed by said removing.

2. The method of claim 1, wherein
the new wire is routed through a higher routing layer than the removed one of the one or more wires.

3. The method of claim 1, further comprising:
calculating timing information for the one or more wires included in the timing path; and
selecting the one of the one or more wires for removal dependent on the timing information.

4. The method of claim 3, wherein
the timing information includes delay information.

5. The method of claim 4, further comprising:
selecting the one of the one or more wires for removal in response to the delay information indicating that the one of the one or more wires has a greater delay than other ones of the one or more wires included in the timing path.

6. The method of claim 5, further comprising:
selecting the one of the one or more wires to remove in response to the delay information indicating that a delay of the one of the one or more wires exceeds a threshold delay.

7. The method of claim 3, wherein
the timing information includes slew information.

8. The method of claim 3, wherein
the timing information includes both slew information and delay information for each of the one or more wires included in the timing path.

9. The method of claim 8, further comprising:
sorting the one or more wires included in the timing path based on the slew information and the delay information;
dependent on an outcome of said sorting, selecting the one of the one or more wires for removal.

10. The method of claim 3, further comprising:
sorting the one or more wires dependent on the timing information; and
selecting the one of the one or more wires for removal in response to said sorting.

11. The method of claim 1, wherein
said removing is dependent on a location of the one of the one or more wires relative to one or more other wires included in the integrated circuit design.

12. The method of claim 11, further comprising:
selecting the one of the one or more wires for removal in response to determining that the one of the one or more wires has fewer neighboring wires than a second one of the one or more wires.

13. The method of claim 1, wherein
said detecting is performed by a sign-off tool.

14. The method of claim 1, further comprising:
removing more than one of the one or more wires included in the timing path, wherein each of the more than one of the one or more wires couples a respective pair of a plurality of pairs of nodes; and
routing a new wire between each pair included in the plurality of pairs of nodes.

15. The method of claim 1, wherein
said routing comprises routing the new wire so that a space exists between the new wire and any other wires, wherein
a size of the space is selected to reduce crosstalk effects between the new wire and one or more other wires.

16. The method of claim 1, wherein
the new wire has less delay and less slew than the one of the one or more wires removed by said removing.
17. The method of claim 1, wherein
said routing does not introduce any new timing violations into the integrated circuit design.
18. The method of claim 1, further comprising:
performing said detecting, said removing, and said routing for a plurality of additional timing paths, wherein
no new buffers are added, no existing drivers are resized, and no existing buffers are resized or moved in response to detection of the timing violations in the timing path and the plurality of additional timing paths; and
subsequent to said performing, no timing violations are detected in a circuit design that includes the timing path and the plurality of additional timing paths.
19. The method of claim 18, wherein
a single wire is selected as the one of the one or more wires to be removed for more than one timing path of the plurality of additional timing paths.
20. A system, comprising:
a processor; and
a memory coupled to the processor and storing program instructions executable by the processor to:
detect a timing violation, caused by crosstalk, in a timing path included in an integrated circuit design;
remove one of one or more wires included in the timing path, wherein the one of the one or more wires couples two nodes; and
route a new wire between the two nodes, wherein the new wire is longer than the removed one of the one or more wires, wherein the new wire experiences fewer crosstalk effects than the removed one of the one or more wires, and wherein a driver for driving signals on the new wire has substantially a same size as a driver for driving signals on the removed one of the one or more wires.
21. The system of claim 20, wherein the program instructions are executable to:
route the new wire through a higher routing layer than the removed one of the one or more wires.
22. The system of claim 20, wherein the program instructions are executable to:
calculate timing information for the one or more wires; and
dependent on the timing information, select the one of the one or more wires for removal.
23. The system of claim 22, wherein
the timing information includes delay information.
24. The system of claim 23, wherein the program instructions are executable to:
select the one of the one or more wires to remove in response to the delay information indicating that a delay of the one of the one or more wires exceeds a threshold delay.
25. The system of claim 22, wherein
the timing information includes slew information.
26. The system of claim 22, wherein the program instructions are executable to:
sort the plurality of wires dependent on the timing information.
27. The system of claim 20, wherein the program instructions are executable to:
remove the one of the one or more wires dependent on a location of the one of the one or more wires relative to one or more other wires.
28. The system of claim 20, wherein the program instructions are executable to:
remove more than one of the one or more wires included in the timing path, wherein each of the more than one of the one or more wires couples a respective pair of a plurality of pairs of nodes; and
route a new wire between each pair included in the plurality of pairs of nodes.
29. The system of claim 20, wherein the program instructions are executable to:
route the new wire so that a space exists between the new wire and any other wires, wherein
a size of the space is selected to reduce crosstalk effects between the new wire and one or more other wires.
30. The system of claim 20, wherein
the new wire has less delay and less slew than the removed one of the one or more wires.
31. The system of claim 20, wherein the program instructions are executable to:
route the new wire without introducing any new timing violations into the integrated circuit design.
32. A computer readable medium comprising program instructions executable to:
detect a timing violation, caused by crosstalk, in a timing path included in the integrated circuit design;
remove one of one or more wires included in the timing path, wherein the one of the one or more wires couples two nodes; and
route a new wire between the two nodes, wherein the new wire is longer than the removed one of the one or more wires, wherein the new wire experiences fewer crosstalk effects than the removed one of the one or more wires, and wherein a driver for driving signals on the new wire has substantially a same size as a driver for driving signals on the removed one of the one or more wires.
33. The computer readable medium of claim 32, wherein the program instructions are executable to:
route the new wire through a higher routing layer than the removed one of the one or more wires.
34. The computer readable medium of claim 32, wherein the program instructions are executable to:
calculate timing information for the one or more wires included in the timing path; and
dependent on the timing information, select the one of the one or more wires for removal.
35. The computer readable medium of claim 34, wherein the timing information includes delay information.
36. The computer readable medium of claim 35, wherein the program instructions are executable to:
select the one of the one or more wires to remove in response to the delay information indicating that a delay of the one of the one or more wires exceeds a threshold delay.
37. The computer readable medium of claim 35, wherein the program instructions are executable to:
select the one of the one or more wires to remove in response to the delay information indicating that the one of the one or more wires has a greater delay than other ones of the one or more wires included in the timing path.
38. The computer readable medium of claim 34, wherein the timing information includes slew information.
39. The computer readable medium of claim 34, wherein the program instructions are executable to:
sort the one or more wires dependent on the timing information.

40. The computer readable medium of claim 32, wherein the program instructions are executable to:
  select the one of the one or more wires for removal dependent on a location of the one of the one or more wires relative to one or more other wires.

41. The computer readable medium of claim 40, wherein the program instructions are executable to:
  select the one of the one or more wires for removal in response to determining that the one of the one or more wires has fewer neighboring wires than a second one of the one or more wires.

42. The computer readable medium of claim 32, wherein the program instructions are executable to:
  remove more than one of the one or more wires included in the timing path, wherein each of the more than one of the one or more wires couples a respective pair of a plurality of pairs of nodes; and
  route a new wire between each pair included in the plurality of pairs of nodes.

43. The computer readable medium of claim 32, wherein the program instructions are executable to:
  route the new wire so that a space exists between the new wire and any other wires, wherein
    a size of the space is selected to reduce crosstalk effects between the new wire and one or more other wires.

44. The computer readable medium of claim 32, wherein the new wire has less delay and less slew than the removed one of the one or more wires.

45. The computer readable medium of claim 32, wherein routing the new wire does not introduce any new timing violations into the integrated circuit design.

46. A computer readable medium, comprising program instructions executable to:
  select one of a one or more wires included in a timing path included in an integrated circuit design for removal in response to a timing violation, caused by crosstalk, being detected in the timing path, wherein
    the one of the one or more wires couples two nodes in the integrated circuit design;
  remove the one of the one or more wires selected by said selecting;
  route a new wire between the two nodes, wherein the new wire is longer than the one of the one or more wires removed by said removing, wherein the new wire experiences fewer crosstalk effects than the removed one of the one or more wires, and wherein a driver for driving signals on the new wire has substantially a same size as a driver for driving signals on the removed one of the one or more wires.

47. The computer readable medium of claim 46, wherein the program instructions are executable to:
  select the one of the one or more wires dependent on timing information associated with each of the one or more wires.

48. A integrated circuit designed by a process, the process comprising:
  detecting a timing violation, caused by crosstalk, in a timing path included in an integrated circuit design;
  removing one of one or more wires included in the timing path, wherein the one of the one or more wires couples two nodes included in the integrated circuit design; and
  routing a new wire between the two nodes, wherein the new wire is longer than the removed one of the one or more wires, wherein the new wire experiences fewer crosstalk effects than the removed one of the one or more wires, and wherein a driver for driving signals on the new wire has substantially a same size as a driver for driving signals on the removed one of the one or more wires;
  wherein the integrated circuit includes an empty space through which a shorter wire coupling the two nodes could have been placed during fabrication of the integrated circuit.

49. The integrated circuit of claim 48, wherein
said routing the new wire comprises routing the new wire through a higher routing layer than the removed one of the one or more wires.

50. The integrated circuit of claim 48, wherein the process further comprises:
  calculating timing information for the one or more wires included in the timing path; and
  selecting the one of the one or more wires for removal dependent on the timing information.

* * * * *